(12) United States Patent
Hudman

(10) Patent No.: US 12,523,799 B1
(45) Date of Patent: Jan. 13, 2026

(54) SELF-ALIGNED LENS ASSEMBLY FOR HEAD-MOUNTED DISPLAYS

(71) Applicant: Valve Corporation, Bellevue, WA (US)

(72) Inventor: Joshua Mark Hudman, Issaquah, WA (US)

(73) Assignee: Valve Corporation, Bellevue, WA (US)

( * ) Notice: Subject to any disclaimer, the term of this patent is extended or adjusted under 35 U.S.C. 154(b) by 275 days.

(21) Appl. No.: 18/343,424

(22) Filed: Jun. 28, 2023

Related U.S. Application Data

(62) Division of application No. 16/191,206, filed on Nov. 14, 2018, now Pat. No. 11,747,525.

(60) Provisional application No. 62/624,651, filed on Jan. 31, 2018, provisional application No. 62/588,073, filed on Nov. 17, 2017.

(51) Int. Cl.
   *G02B 3/08*       (2006.01)
   *G02B 3/00*       (2006.01)

(52) U.S. Cl.
   CPC ............. *G02B 3/08* (2013.01); *G02B 3/0012* (2013.01)

(58) Field of Classification Search
   CPC ................................ G03B 3/08; G02B 3/0012
   See application file for complete search history.

(56) References Cited

U.S. PATENT DOCUMENTS

| | | | |
|---|---|---|---|
| 5,229,885 A | | 7/1993 | Quaglia |
| 5,538,674 A | * | 7/1996 | Nisper ............. B29D 11/00971 264/1.36 |
| 5,728,324 A | * | 3/1998 | Welch ............. B29D 11/00269 264/1.36 |
| 6,646,807 B2 | | 11/2003 | Yoshikawa et al. |
| 9,459,457 B2 | | 10/2016 | Murray et al. |
| 2013/0176628 A1 | | 7/2013 | Batchko et al. |

\* cited by examiner

*Primary Examiner* — JaMel M Nelson
*Assistant Examiner* — Erica Hartsell Funk
(74) *Attorney, Agent, or Firm* — Seed Intellectual Property Law Group LLP

(57) ABSTRACT

Systems and methods for a cost-effective, high-performance optical lens for head mounted displays (HMDs) or other applications. The lens assembly combines a thin lens with microfeatures on at least one transmission surface, and a thicker lens with a curved surface, allowing for plano-convex or bi-convex configurations. Both lenses have mounting areas with complementary microfeatures on their peripheries, facilitating their coupling and self-alignment within low tolerances. These microfeatures, including the mounting ones, can be generated using a high-precision process like diamond turning, thereby ensuring precision in alignment and function.

17 Claims, 9 Drawing Sheets

SELF-ALIGNED LENS ASSEMBLY FOR HEAD-MOUNTED DISPLAYS

BACKGROUND

Technical Field

The present disclosure generally relates to optical systems for displays, such as micro displays of head-mounted display systems.

Description of the Related Art

One current generation of virtual reality ("VR") experiences is created using head-mounted displays ("HMDs"), which can be tethered to a stationary computer (such as a personal computer ("PC"), laptop, or game console), combined and/or integrated with a smart phone and/or its associated display, or self-contained. Generally, HMDs are display devices, worn on the head of a user, which have a small display device in front of one (monocular HMD) or each eye (binocular HMD). The display units are typically miniaturized and may include CRT, LCD, Liquid crystal on silicon (LCos), or OLED technologies, for example. A binocular HMD has the potential to display a different image to each eye. This capability is used to display stereoscopic images.

Demand for displays with heightened performance has increased with the development of smart phones, high-definition televisions, as well as other electronic devices. The growing popularity of virtual reality and augmented reality systems, particularly those using HMDs, has further increased such demand. Virtual reality systems typically envelop a wearer's eyes completely and substitute a "virtual" reality for the actual or physical view (or actual reality) in front of the wearer, while augmented reality systems typically provide a semi-transparent or transparent overlay of one or more screens in front of a wearer's eyes such that actual view is augmented with additional information, and mediated reality systems may similarly present information to a viewer that combines real-world elements with virtual elements. In many virtual reality and augmented reality systems, the movement of a wearer of such a head-mounted display may be tracked in various manners, such as via sensors in the head-mounted display and/or external to it, in order to enable the images being shown to reflect user movements.

However, such head mounted displays, with reduced distance between a viewer's eye and the display and often with a fully obscured field of view, typically have complex performance requirements for optical lenses in ways that are difficult to satisfy, let alone to do so at cost-effective levels, and other devices using displays with optical lenses may have similar problems. Micro displays, such as OLED micro displays, are much smaller than traditional displays but involve additional challenges. For instance, micro displays require very short focal length lenses. Further, because the eye pupil size of a user is fixed, the F/# of a lens of an HMD which uses a micro display is decreased, which tends to increase the aberrations of a particular lens system. Moreover, micro displays have small pixels. This increase of the spatial resolution of the HMD optic further increases the challenge to design and manufacture the lens for such an HMD. In addition, manufacturing of such head-mounted displays can be difficult and costly, such as due to challenges that include precise manufacturing tolerance requirements and limitations in existing mass production capabilities.

Accordingly, needs exist to provide cost-effective lenses for HMDs and other applications that meet complex performance requirements.

BRIEF SUMMARY

A lens assembly for use with a display of a head mounted display (HMD) may be summarized as including a first lens having a central optical transmission area and a peripheral mounting area, at least one surface of the optical transmission area having optical transmission microfeatures thereon, and at least one surface of the peripheral mounting area having mounting microfeatures thereon; and a second lens having a central optical transmission area and a peripheral mounting area, at least one surface of the peripheral mounting area having mounting microfeatures thereon that, in operation, mate with the mounting microfeatures of the first lens to couple the second lens to the first lens in alignment. The optical transmission microfeatures on the at least one surface of the optical transmission area of the first lens may include a Fresnel pattern. The first lens may have a first maximum thickness and the second lens may have a second maximum thickness that is less than the first maximum thickness. The first lens may be substantially planar in shape, and the second lens may be substantially convex-concave in shape. A cavity may be present between the first lens and the second lens, and the cavity may be sealed by the mounting microfeatures of the first and second lens. The cavity may have a gaseous pressure that is much less than atmospheric pressure. The mounting microfeatures of the first lens may include a ridge disposed at a first angle, and the mounting microfeatures of the second lens may include a ridge disposed at a second angle, the second angle equal to the first angle.

A head mounted display system may be summarized as including first and second display subsystems which each provide a display for one eye of a user, each of the first and second display subsystems comprising: a micro display; and a lens assembly disposed between one eye of the user and the micro display, the lens assembly including a first lens having a central optical transmission area and a peripheral mounting area, at least one surface of the optical transmission area having optical transmission microfeatures thereon, and at least one surface of the peripheral mounting area having mounting microfeatures thereon; and a second lens having a central optical transmission area and a peripheral mounting area, at least one surface of the peripheral mounting area having mounting microfeatures thereon that, in operation, mate with the mounting microfeatures of the first lens to couple the second lens to the first lens in alignment. The optical transmission microfeatures on the at least one surface of the optical transmission area of the first lens may include a Fresnel pattern. The first lens may have a first maximum thickness and the second lens may have a second maximum thickness that is less than the first maximum thickness. The first lens may be substantially planar in shape, and the second lens may be substantially convexo-concave in shape. A cavity may be present between the first lens and the second lens, and the cavity may be sealed by the mounting microfeatures of the first and second lens. The cavity may have a gaseous pressure that is much less than atmospheric pressure. The mounting microfeatures of the first lens may include a ridge disposed at a first angle, and the mounting microfeatures of the second lens may include a ridge disposed at a second angle, the second angle equal to the first angle.

A method of manufacturing a lens may be summarized as including providing a first mold insert comprising a machinable surface, the machinable surface comprising a central region and a peripheral region, the central region corresponding to an optical transmission area of a surface of a first lens to be manufactured using the first mold insert, and the peripheral region corresponding to a mounting area of a surface of the first lens; machining a negative pattern of optical transmission microfeatures onto the central region of the machinable surface of the first mold insert; machining a negative pattern of mounting microfeatures onto the peripheral region of the machinable surface of the first mold insert; and molding the first lens using the machined first mold insert in an injection mold process.

The method may further include providing a second mold insert comprising a machinable surface, the machinable surface comprising a central region and a peripheral region, the central region corresponding to an optical transmission area of a surface of a second lens to be manufactured using the second mold insert, and the peripheral region corresponding to a mounting area of a surface of the second lens; machining a negative pattern of a curved surface onto the central region of the machinable surface of the second mold insert; machining a negative pattern of mounting microfeatures onto the peripheral region of the machinable surface of the second mold insert; and molding the second lens using the machined second mold insert in an injection mold process.

The method may further include mating the mounting microfeatures of the first and second lenses together to couple the first and second lens together in alignment. Mating the mounting microfeatures of the first and second lenses together may include mating the mounting microfeatures of the first and second lenses together in a vacuum chamber. Machining a negative pattern of optical transmission microfeatures onto the central region of the machinable surface of the first mold insert may include machining a negative pattern for a Fresnel pattern onto the central region of the machinable surface of the first mold insert. Machining a negative pattern of mounting microfeatures onto the peripheral region of the machinable surface of the first mold insert may include machining at least one negative pattern for a mounting ridge onto the peripheral region of the machinable surface of the first mold insert.

A lens assembly for use with a display of a head mounted display (HMD) may be summarized as including a first lens having a central optical transmission area and a peripheral mounting area, at least one surface of the central optical transmission area having optical transmission microfeatures thereon, and at least one surface of the peripheral mounting area having mounting features thereon; and a second lens having a central optical area and a peripheral mounting area, at least one surface of the peripheral mounting area having mounting features thereon that, in operation, mate with the mounting features of the first lens to couple the second lens to the first lens in alignment, the second lens comprising a central optical transmission area comprising a curved, non-Fresnel surface. The optical transmission microfeatures of the first lens may include a Fresnel pattern. The central optical transmission area of the first lens may be substantially planar in shape. The central optical transmission area of the second lens may be substantially convex-concave, plano-convex, or bi-convex. At least one surface of the central transmission area of the second lens may have a radius of curvature that is between 250 millimeters and 1000 millimeters. The central optical transmission area of the first lens may be substantially planar in shape, and the central optical transmission area of the second lens may be plano-convex. The central optical transmission area of the first lens may be substantially planar in shape, and the central optical transmission area of the second lens may be bi-convex. A cavity may be present between the first lens and the second lens. The cavity may have a gaseous pressure that is much less than atmospheric pressure.

A head mounted display system may be summarized as including first and second display subsystems which each provide a display for one eye of a user, each of the first and second display subsystems including a micro display; and a lens assembly disposed between one eye of the user and the micro display, the lens assembly including a first lens having a central optical transmission area and a peripheral mounting area, at least one surface of the central optical transmission area having optical transmission microfeatures thereon, and at least one surface of the peripheral mounting area having mounting features thereon; and a second lens having a central optical area and a peripheral mounting area, at least one surface of the peripheral mounting area having mounting features thereon that, in operation, mate with the mounting features of the first lens to couple the second lens to the first lens in alignment, the second lens comprising a central optical transmission area comprising a curved, non-Fresnel surface. The optical transmission microfeatures of the first lens may include a Fresnel pattern. The central optical transmission area of the first lens may be substantially planar in shape. The central optical transmission area of the second lens may be substantially convex-concave, plano-convex, or bi-convex. At least one surface of the central transmission area of the second lens may have a radius of curvature that is between 250 millimeters and 1000 millimeters. The central optical transmission area of the first lens may be substantially planar in shape, and the central optical transmission area of the second lens may be plano-convex. The central optical transmission area of the first lens may be substantially planar in shape, and the central optical transmission area of the second lens may be bi-convex. A cavity may be present between the first lens and the second lens. The cavity may have a gaseous pressure that is much less than atmospheric pressure.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
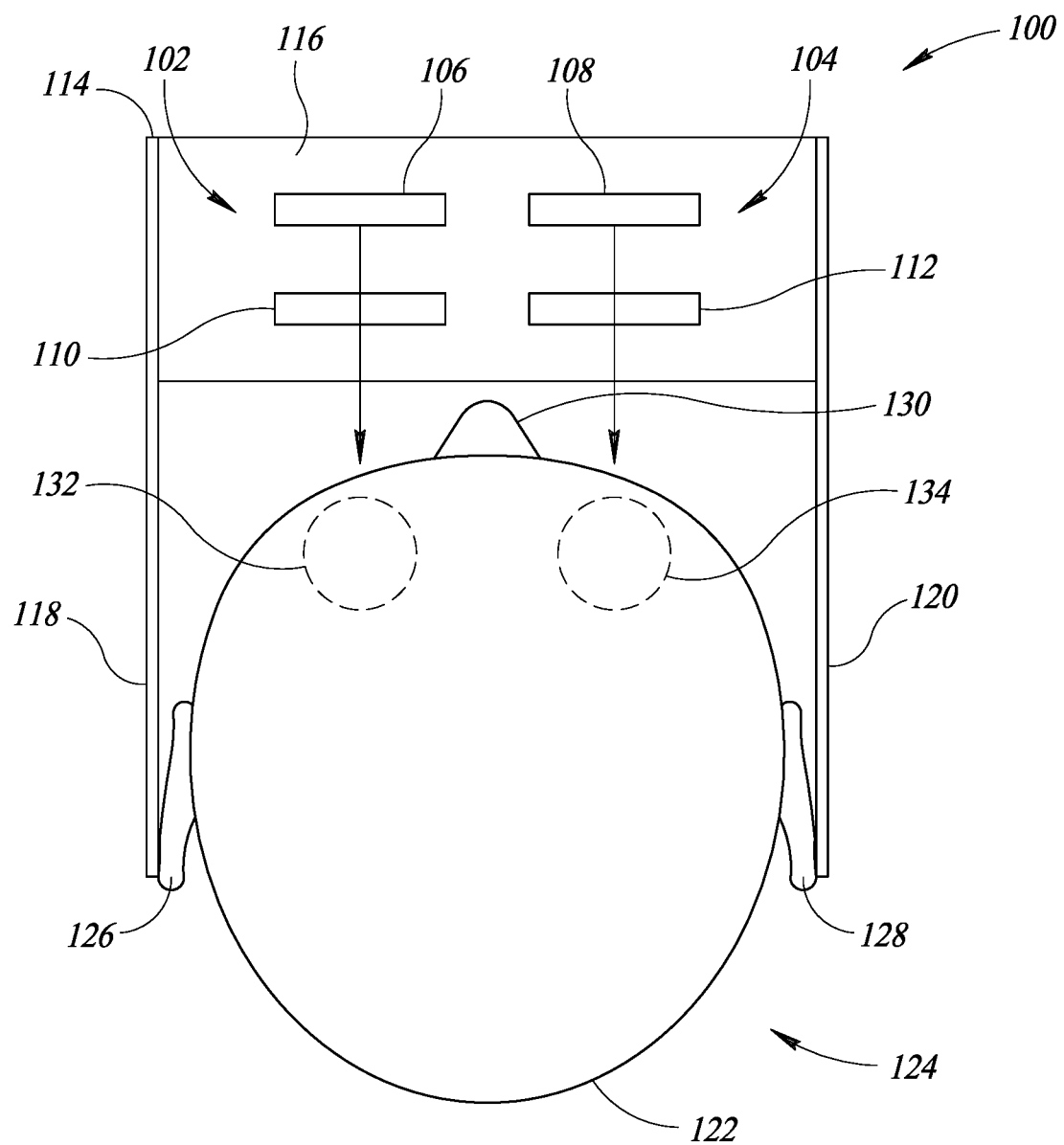
FIG. 1 illustrates a top plan view of a head-mounted display system which includes binocular display panels according to an example embodiment of the present disclosure.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

The present disclosure relates generally to techniques for providing an optical lens for an HMD or other application that is cost-effective and has high performance. Generally, in at least some implementations, a lens assembly is provided that includes a first, relatively thin lens and a second, relatively thick lens. The first lens may be substantially planar ("flat") and may include microfeatures (e.g., Fresnel pattern) on at least one optical transmission surface or area ("clear aperture") thereof that are formed by a high precision process (e.g., diamond turning). The second lens may have at least one curved surface (e.g., plano-concave, concave-convex, bi-convex) and may not include any microfeatures on the optical transmission surfaces or areas thereof. The second lens may be planar or curved (e.g., concave, convex) and may not include any microfeatures on the optical transmission surfaces or areas thereof. In at least some implementations, at least one surface of the central transmission area of the second lens has a radius of curvature that is between 250 millimeters and 1000 millimeters, for example. Each of the first lens and the second lens may include corresponding mounting areas or surfaces (or flanges), also referred to as a mounting datum, disposed about a periphery of the respective optical transmission areas of the lenses outside the optical transmission areas of the lenses.

The mounting surfaces may include complementary registration or mounting features or microfeatures thereon that enable the first and second lens to be coupled together and, when so coupled, to be self-aligned with each other. within a very low tolerance (e.g., within 10-15 microns, for example). The complementary mounting microfeatures may facilitate coupling the lenses together via a press or friction fit that does not require any adhesive or other fasteners to maintain the lenses coupled and alighted with each other. The mounting microfeatures may be provided on the lenses using the same high precision process used to generate the microfeatures on at least one optical transmission surface of the first, relatively thin, lens of the lens assembly. In at least some implementations, the precision process used to generate the mounting microfeatures and the microfeatures on the optical transmission surface(s) is diamond turning on oversized optical inserts sized to shape both an optical transmission surface and a peripheral mounting surface. Another example precision process that may be used is micro- or nano-milling. Such techniques provide performance lens assemblies that can be manufactured in a cost-effective manner that is advantageous over existing techniques that utilize a single thick lens having microfeatures on at least one optical transmission surface thereof. Various example implementations of the present disclosure are provided below with reference to the drawings.

FIG. 1 is a simplified top plan view of an HMD system 100 that includes a pair of near-to-eye display systems 102 and 104. The near-to-eye display systems 102 and 104 include displays 106 and 108, respectively (e.g., OLED micro-displays), and respective optical lens systems 110 and 112 that each have one or more optical lenses. The display systems 102 and 104 may be mounted to a frame 114 or other mounting structure which includes a front portion 116, a left temple 118 and right temple 120. The two display systems 102 and 104 may be secured to the frame 114 in an eye glasses arrangement which can be worn on the head 122 of a wearer user 124. The left temple 118 and right temple 120 may rest over the user's ears 126 and 128, respectively, while a nose assembly (not shown) may rest over the user's nose 130. The frame 114 may be shaped and sized to position each of the two optical systems 110 and 112 in front of one of the user's eyes 132 and 134, respectively. Although the frame 114 is shown in a simplified manner similar to eyeglasses for explanatory purposes, it should be appreciated that in practice more sophisticated structures (e.g., goggles, integrated headband, helmet, straps, etc.) may be used to support and position the displays systems 102 and 104 on the head 122 of user 124.

The HMD system 100 of FIG. 1 is capable of presenting a virtual reality display to the user 124, such as via corresponding video presented at a display rate such as 30 frames (or images) per second or 90 frames per second, while other embodiments of a similar system may present an augmented reality display to the user 124. Each of the displays 106 and 108 may generate light which is transmitted through and focused by the respective optical systems 110 and 112 onto the eyes 132 and 134, respectively, of the user 124. While not illustrated here, each of the eyes includes a pupil aperture through which light passes into the eye, with a typical pupil size ranging from 2 mm (millimeters) in diameter in very bright conditions to as much as 8 mm in dark conditions, while the larger iris in which the pupil is contained may have a size of approximately 12 mm—the pupil (and enclosing iris) may typically move within the visible portion of the eye under open eyelids by several millimeters in the horizontal and/or vertical directions, which will also move the pupil to different depths from the optical lens or other physical elements of the display for different horizontal and vertical positions as the eyeball swivels around its center (resulting in a three dimensional volume in which the pupil can move). The light entering the user's pupils is seen by the user 124 as images and/or video. In some implementations, the distance between each of the optical systems 110 and 112 and the user's eyes 132 and 134 may be relatively short (e.g., less than 30 mm, less than 20 mm), which advantageously causes the HMD system 100 to appear lighter to the user since the weight of the optical systems and the display systems are relatively close to the user's face, and also may provide the user with a greater field of view. While not illustrated here, some embodiments of such an HMD may include various additional internal and/or external sensors, such as to perform pupil tracking separately for each eye 132 and 134, to track head location and orientation (e.g., as part of head tracking), to track various other types of movements and position of the user's body, cameras to record external images (e.g., of an environment), etc.

While the described techniques may be used in some embodiments with a display system similar to that illustrated in FIG. 1, in other embodiments other types of display systems may be used, including with a single optical lens and display device, or with multiple such optical lenses and display devices. Non-exclusive examples of other such devices include cameras, telescopes, microscopes, binoculars, spotting scopes, surveying scopes, etc. In addition, the described techniques may be used with a wide variety of display panels or other display devices that emit light to form images, which one or more users view through one or more optical lens. In other embodiments, the user may view one or more images through one or more optical lens that are produced in manners other than via a display panel, such as on a surface that reflects light from another light source in part or in whole.

Figure 2:
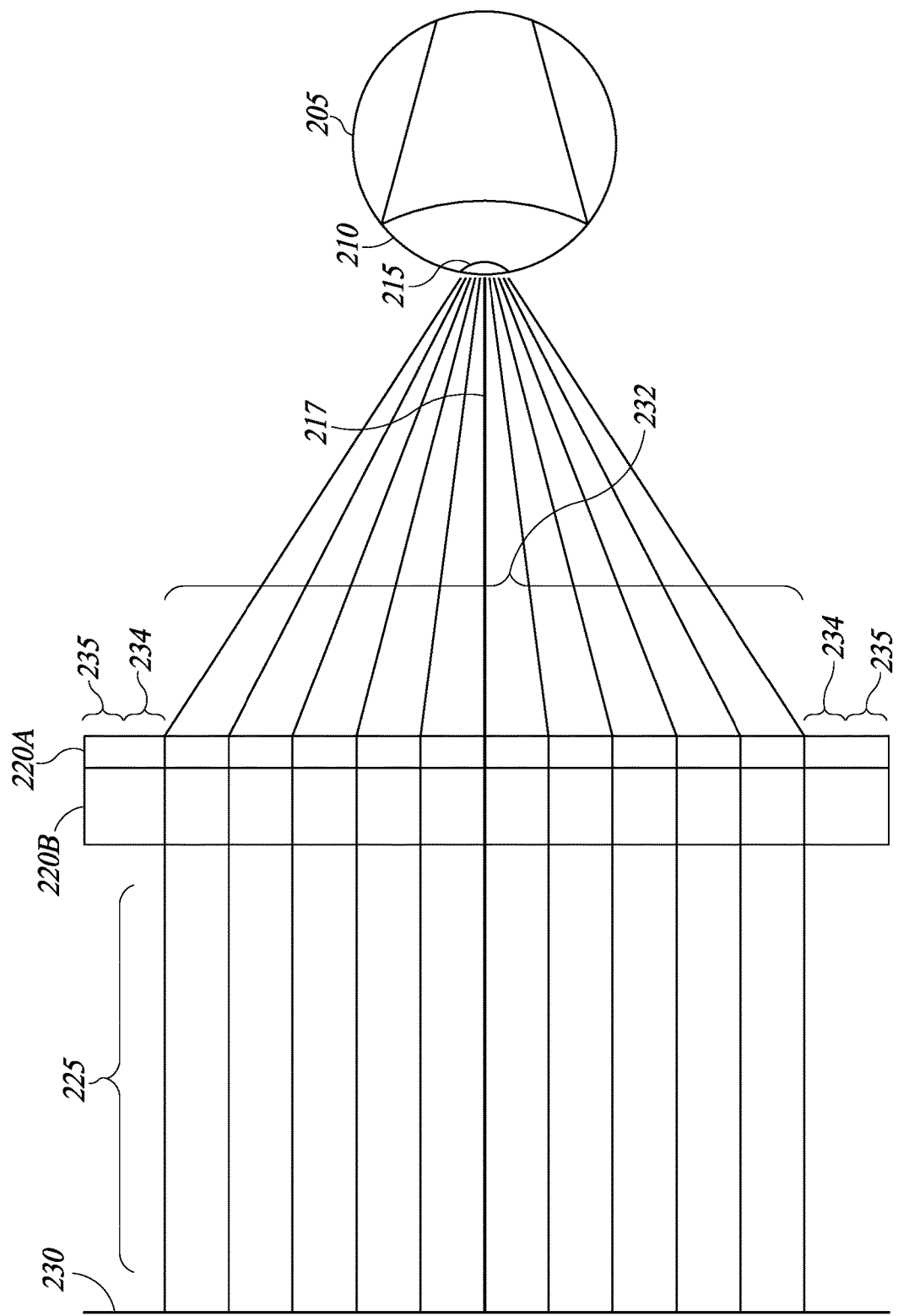
FIG. 2 illustrates an example of use of an optical lens assembly, such as for head-mounted displays, in particular manners in particular embodiments in accordance with the described techniques of the present disclosure.

FIG. 2 illustrates an example of use of optical lenses, such as for head-mounted displays, in particular manners in particular embodiments in accordance with the described techniques. A human user's eye 205 is illustrated, with an iris section 210 that includes a pupil 215. An example display panel 230 is shown from a side view, with an optical lens assembly 220 (also shown from the side) situated between the eye 205 and the display panel 230. In the illustrated implementation, the optical lens assembly includes a first, relatively thin lens 220A coupled to or mounted on a second, relatively thick lens 220B. The lenses 220A and 220B may have a diameter suitable for a particular application. For example, the lenses 220A and 220B may have a diameter that is between 3 cm and 6 cm, for example. Various examples of the particular features of the optical lens assembly 220 are provided below with reference to FIGS. 3-9C.

As the display panel 230 generates various light rays 225 from pixels (not shown) of the display panel, the light travels outward and into the lens assembly 220. The lens assembly 220 bends the light rays 225 from different portions of the display panel 230 so that the respective light rays emerging from the optical lens assembly 220 are entering the pupil 215 at corresponding locations, so as to form the image displayed on the display panel 230 on the pupil and inner portions of the eye. With respect to light entering a central axis 217 of the optical lens assembly 220 (with respect to both horizontal and vertical axes, although only the vertical axis is visible in this side view), and if the pupil 215 is similarly aligned with that central axis, the lens assembly 220 may perform little or no bending of the light rays emerging from the display panel 230. It will be appreciated that the optical lens assembly 220 and display panel 230 are illustrated from the side, and light rays may be emitted from the display panel in not only a vertical manner as is illustrated but also in a horizontal manner (or depth with respect to this side view) that is not illustrated in this example. Furthermore, while the light rays 225 are illustrated as leaving the display panel 230 is purely a straight line for the purpose of this example, it will be appreciated that some or all pixels of the display panel emit light in multiple directions (or with at least some variation from being purely orthogonal to the surface of the display panel), even if focused by per-pixel lenses (not shown).

Figure 3:
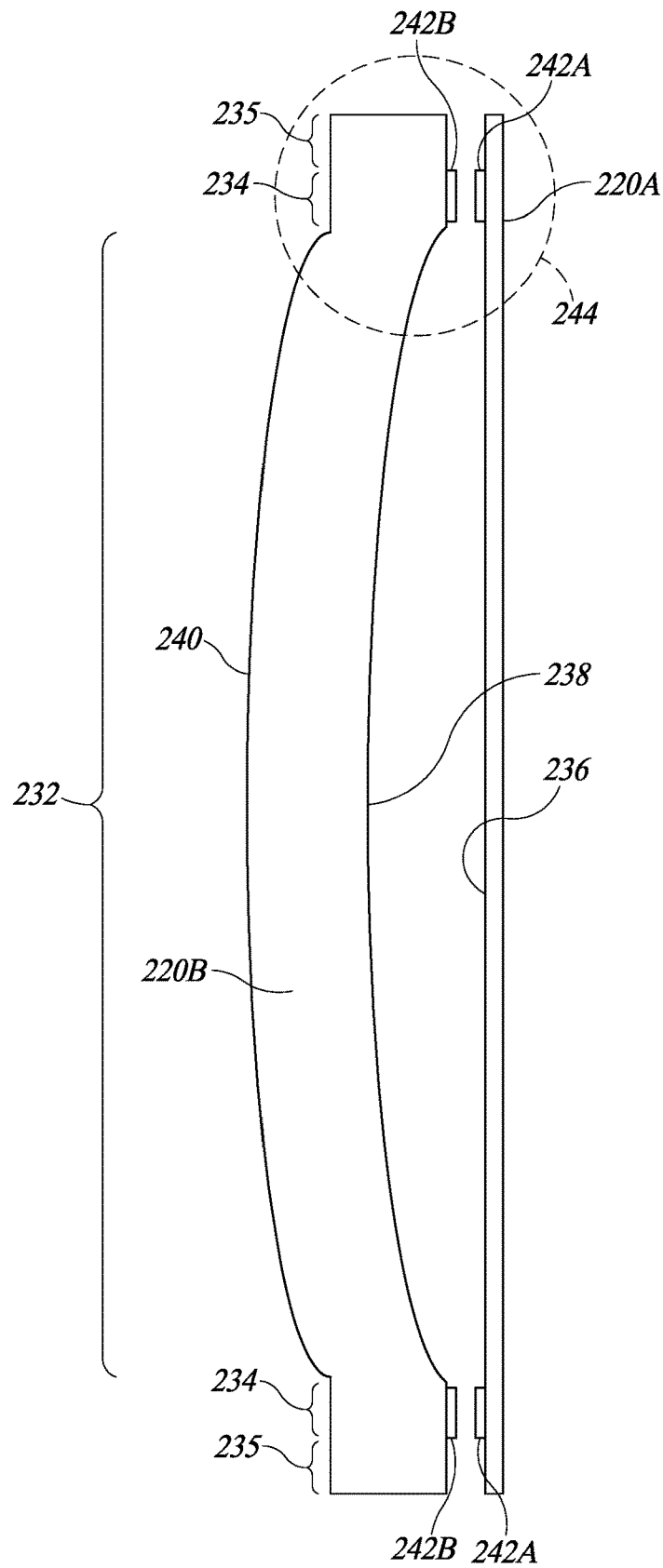
FIG. 3 is an illustration of a lens assembly for an HMD or other device, in accordance with the described techniques of the present disclosure.

FIG. 3 shows a more detailed schematic view of the optical lenses 220A and 220B of the optical lens assembly of FIG. 2. The optical lenses 220A and 220B are shown spaced apart from each other for explanatory purposes. As shown in FIGS. 2 and 3, each of the optical lenses 220A and 220B of the optical lens assembly 220 may include a central optical transmission area or clear aperture 232, a peripheral mounting area or flange 234 that extends around at least a portion of the optical transmission area, and a flange 235 that extends around at least a portion of the mounting area 234. As discussed further below, in at least some implementations, the first optical lens 220A is a relatively thin lens that includes optical transmission area microfeatures 236 (e.g., Fresnel pattern) on at least one surface in the optical transmission area 232 of the first optical lens. The second optical lens 220B may be a relatively thick lens that has opposing surfaces 238 and 240, one or both of which may be curved (e.g., concave, convex) surfaces without microfeatures in the optical transmission area 232.

Figure 5A:
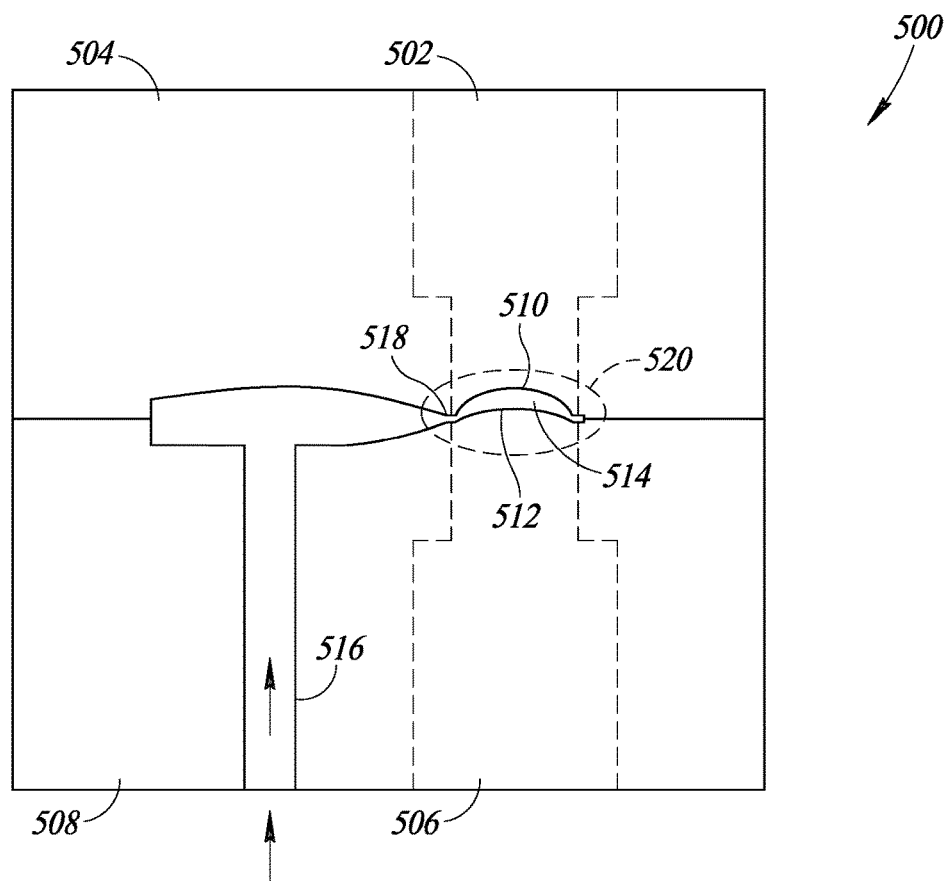
FIG. 5A is a schematic diagram of an example injection molding apparatus for molding optical elements, in accordance with the described techniques of the present disclosure.
Figure 5B:
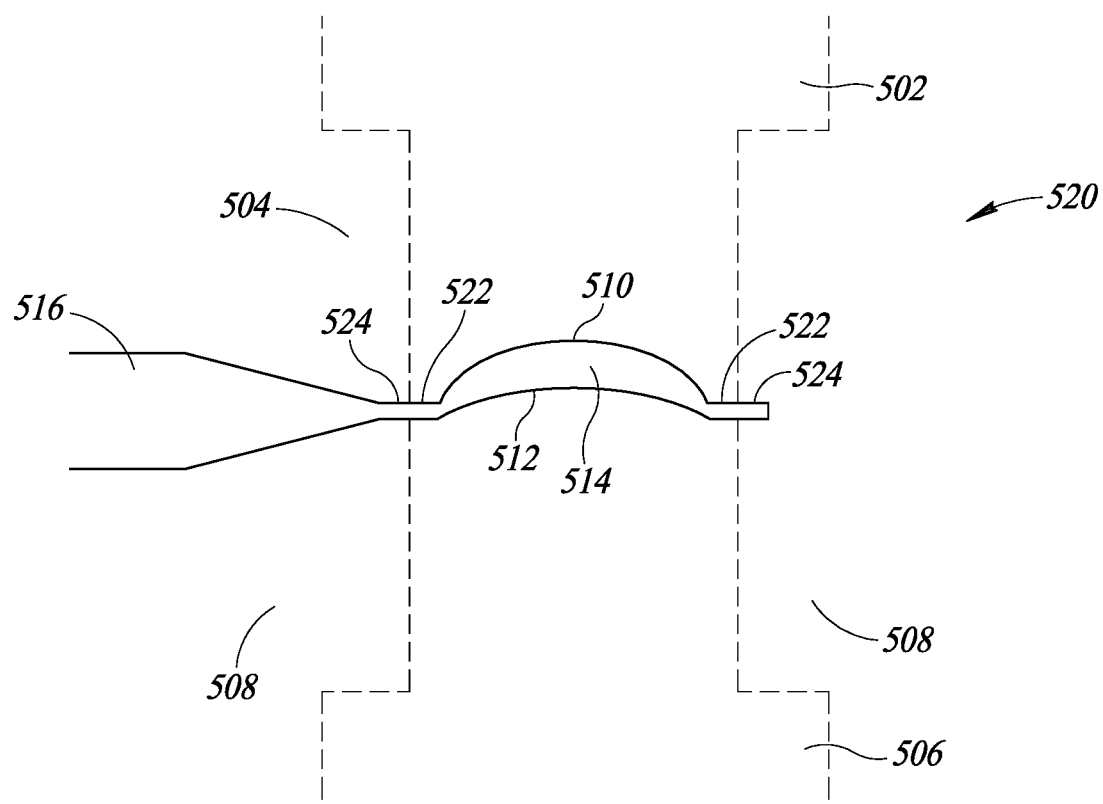
FIG. 5B is an enlarged view of a portion of the injection molding apparatus also shown in FIG. 5A, in accordance with the described techniques of the present disclosure.

The mounting areas 234 of each of the optical lenses 220A and 220B may include complementary mounting microfeatures 242A and 242B (or "registration features") thereon that enable the first and second lenses to be coupled together and, when so coupled, to be self-aligned with each other within a very low tolerance (e.g., within 10-15 microns, for example). In at least some implementations, the complementary mounting microfeatures 242A and 242B may facilitate coupling the lenses 220A and 220B together via a press or friction fit that does not require any adhesive or other fasteners to maintain the lenses coupled and alighted with each other. An example of features positioned on mounting areas 234 are shown in FIGS. 5A-5B, which show portions of a lens assembly. The mounting microfeatures 242A and 242B may be provided on the lenses 220A and 220B, respectively, using the same high precision process used to generate the optical transmission microfeatures 236 on at least one optical transmission surface of the first optical lens 220A of the lens assembly 220. As discussed further below, in at least some implementations, the precision process used to generate the mounting microfeatures and the microfeatures on the optical transmission surface(s) may be diamond turning on an oversized optical insert sized to form both an optical transmission surface and a peripheral mounting surface of the lenses 220A and 220B of the lens assembly 220. Various examples of microfeatures positioned on mounting areas 234 are shown in FIGS. 7A-7B, 8A-8B, and 9A-9C, which show portions of respective lens assemblies that correspond to a peripheral portion indicated by a dashed circle 244 in FIG. 3.

Figure 4:
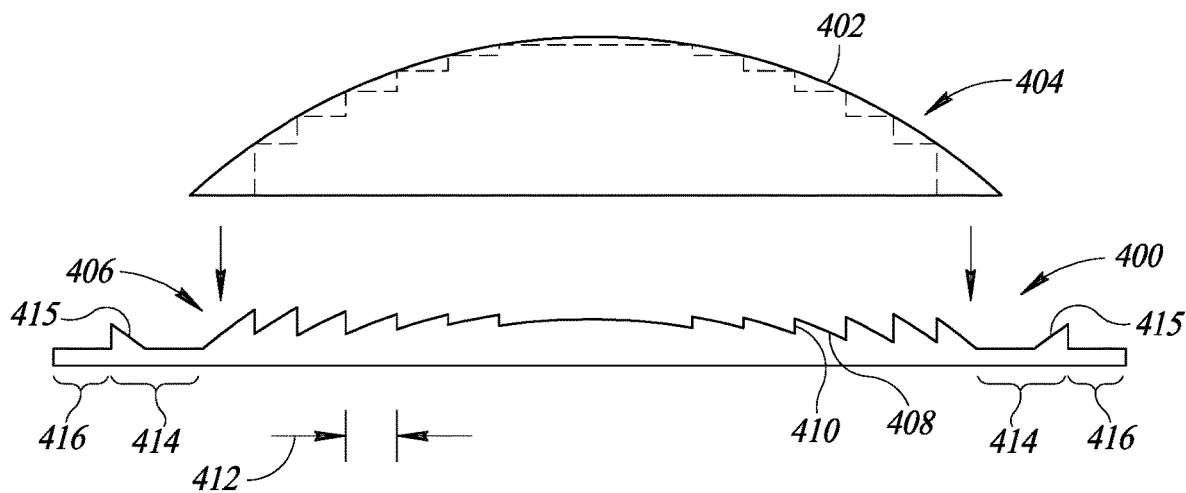
FIG. 4 is an illustration of a lens that includes microfeatures in the form of a Fresnel pattern, in accordance with the described techniques of the present disclosure.

FIG. 4 shows a simplified example of an optical lens that includes microfeatures in the form of a Fresnel pattern. For example, the pattern used for the optical lens shown in FIG. 4 may be similar to a microfeature pattern used in the optical transmission area 232 of at least one surface of the thin first optical lens 220A of FIGS. 2 and 3.

Generally, Fresnel lenses are a type of lens which provides a large aperture and a short focal length without requiring the mass and volume of material that would otherwise be required by a lens of conventional design. FIG. 4 shows a Fresnel lens 400 which may be used as an optical system for an HMD. The Fresnel lens 400 may include a periodic refractive structure of concentric prisms. The surfaces of each of these prisms are designed to refract light by collapsing an aspheric surface 402 of a corresponding conventional lens 404 into nearly a plane. Hence, the reduction in bulk lens thickness may be considered to be substantially equal to the volume bounded by the original aspheric surface 402 and the new lens surface defined by the surface of the prisms. As noted above, this bulk reduction allows Fresnel lenses to be substantially thinner and lighter than their conventional counterparts, which is advantageous for HMD systems where reduced size and weight are important.

The refractive surfaces 406 of the prisms which make up the Fresnel surface may be referred to as grooves 408 and drafts 410. The grooves 408 and drafts 410 may be collectively referred to herein as "Fresnel features," "Fresnel cuts," or "microfeatures," and the overall shape and dimensions of the grooves and drafts may be referred to as a Fresnel pattern. The grooves 408 are the actual surfaces which are used to approximate the continuous curvature of the aspheric surface 402 of the conventional lens 404, while the drafts 410 are the discontinuities between the grooves that are required to return the curvature of the lens back to a plane (or curved surface). The lateral distance between the peaks of adjacent grooves is referred to as the pitch 412. As an example, the Fresnel lens may a pitch of 500 µm. The pitch for a Fresnel surface may be constant or variable across the lateral surface of a Fresnel lens. Further, although the Fresnel lens 400 is shown in FIG. 4 on a planar surface for explanatory purposes, in at least some of the implementations Fresnel surfaces may be provides on curved surfaces (e.g., concave surfaces, convex surfaces) which may allow for unique and advantageous aberration control.

As shown in FIG. 4, the Fresnel lens 400 includes a peripheral mounting area 414 having a microfeature pattern 415 thereon, and a peripheral flange 416 disposed outward of the mounting area. In the illustrated example, the microfeature pattern 415 may be a sloped ridge that extends around at least a portion of the periphery of the Fresnel lens 400. The microfeature pattern 415 may be operative to couple with a complementary microfeature pattern of another lens to form a self-aligned lens assembly, as discussed herein.

FIG. 5A shows a simplified illustration of an injection mold apparatus 500 for molding optical elements, such the optical lenses 220A and 220B of the lens assembly shown in FIGS. 2 and 3. FIG. 5B shows an enlarged view of a portion of the injection mold apparatus 500 indicated by a dashed line 520 in FIG. 5A. The injection mold apparatus 500 may be used to generate lenses that have precision optical transmission microfeatures as well as precision mounting microfeatures. The injection mold apparatus 500 includes a first mold insert 502 (or "optical insert") held in a first mold base 504. The injection mold apparatus 500 also includes a second mold insert 506 opposite the first mold insert 502 that resides in a second mold base 508. Plastic injection molded lenses formed by the injection mold apparatus 500 may be of a variety of configurations including plano-plano, plano-convex, plano-concave, convex-convex, concave-concave, and convex-concave. Additionally, one or more surfaces of the molded lenses may be molded to include microfeatures, such as a Fresnel pattern in the optical transmission area and mounting microfeatures in the mounting area of the lenses. In the simplified example shown in FIGS. 5A-5B, the first mold insert 502 includes a molding surface 510 for molding a lens with a convex surface while the second mold insert 506 includes a molding surface 512 configured to mold a lens with a concave surface. To form a lens, molten optical plastic may be delivered to a mold cavity 514 between the inserts 502 and 506 via a channel 516 through a gate 518. The molding surfaces 510 and 512 are used to define both the clear aperture of the lens to be molded, as well as a mounting area 522 (FIG. 5B) of the lens to be molded. Thus, one or both of the inserts 502 and 506 may be used to provide microfeatures on the clear aperture and/or the mounting area of the lens to be molded by the injection mold apparatus 500. A flange area 524 positioned outward of the mounting area 522 is defined by the first and second mold bases 504 and 508.

By shaping the molding surface 510 of the first mold insert 502 and the molding surface 512 of the second mold insert 506, optical lenses with particular diffractive patterns (e.g., concave, convex, planar, microfeatures) and mounting microfeatures may be formed using the injection mold apparatus 500.

For injection molding, it is necessary to produce a mold insert (e.g., mold insert 502, mold insert 506) which includes a surface pattern on the mold surface (e.g., surface 510, surface 512) which is the negative of the surface pattern which is to be imparted to the lens or element molded therewith. In at least some implementations of the present disclosure, to form the negative surface pattern in a mold insert, the mold insert is mounted on a diamond turning lathe and a negative of the desired diffractive pattern is machined directly into the mold insert, as discussed further below with reference to FIG. 6.

Figure 6:
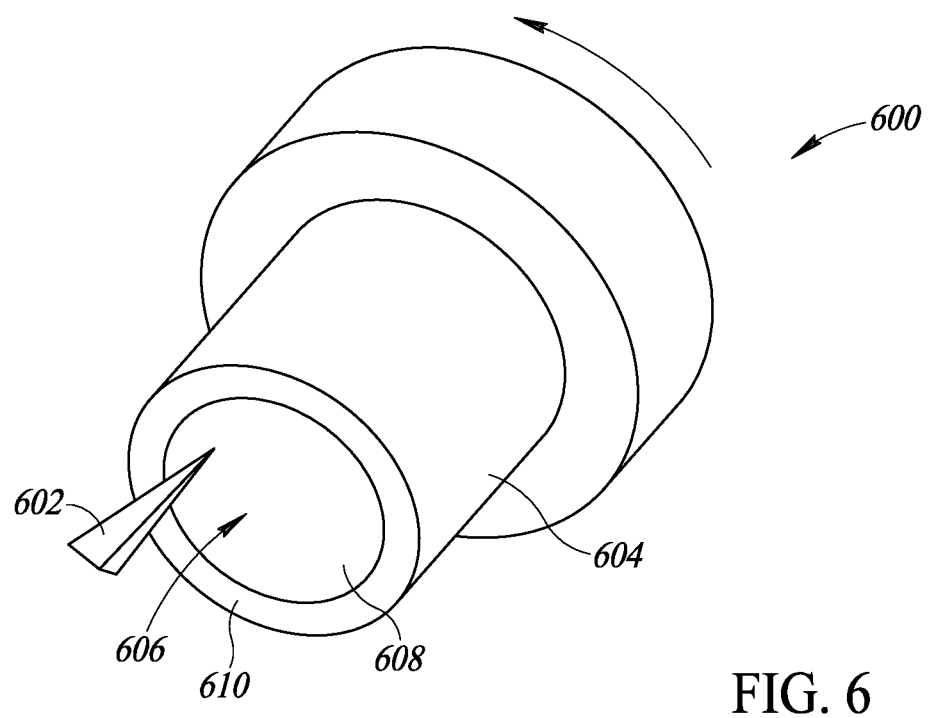
FIG. 6 illustrates a process of machine-working an optical mold insert for use in an injection molding apparatus, such as the injection molding apparatus of FIG. 5, in accordance with the described techniques of the present disclosure.

FIG. 6 shows an example of a mold insert or die 600, also referred to as an optical insert, that may be machine worked by a cutting tool 602 (e.g., diamond tool) using a high precision, single point diamond turning process. In this illustration, the mold insert 600 includes a body 604 and a machinable surface 606 that includes a central region 608 that corresponds to an optical transmission area of a surface of a lens to be manufactured using the mold insert, and a peripheral region 610 that corresponds to a mounting area of a surface of a lens to be manufactured using the mold insert. In operation, the mold insert 600 and the cutting tool may be rotated relative to each other by a drive system (not shown), and the central region 608 and the peripheral region 610 of the surface may be cut by the cutting tool 602 to form a desired pattern on the surface, which is a negative of the surface pattern which is to be imparted on the lens to be manufactured using the mold insert. Then, the mold insert 600 may be used in an injection mold apparatus to form a surface (e.g., top surface, bottom surface) of a lens.

The mold insert 600 may be formed of any suitable material. For example, the mold insert 600 may be formed from stainless steel, fused silica, alumina and other ceramics, as well as structural glasses. In at least some implementations, the surface 606 of the mold insert 600 that is to be machined by the cutting tool 602 may be formed of or coated with one or more materials that are different from the material used to form the body 604 of the mold insert. For example, the machining surface 606 may be a suitable material (e.g., nickel), or the portion of the body 604 of the mold insert 600 proximate the surface 606 to be machined may include a layer of a first material (e.g., chromium carbide) which receives a final machinable coating of a second material (e.g., nickel).

FIGS. 7A-9C show various example mounting areas and flange areas of a periphery of lens assemblies (see portion 244 of FIG. 3) that include complementary mounting microfeatures that may be used to couple and align lenses together, for example, to provide lens assemblies, such as the lens assembly 220 of FIGS. 2 and 3. The mounting microfeatures may be formed using one or more of the same precision processes (e.g., diamond turning a mold insert, injection molding) used to form microfeatures on one or more optical transmission areas of one or more lenses. It should be appreciated that the illustrations provided in FIGS. 7A-9C are examples, and should not be considered as limiting. Indeed, a person of ordinary skill in the art will recognize the many variations that may be implemented using the techniques described herein.

Figure 7A:
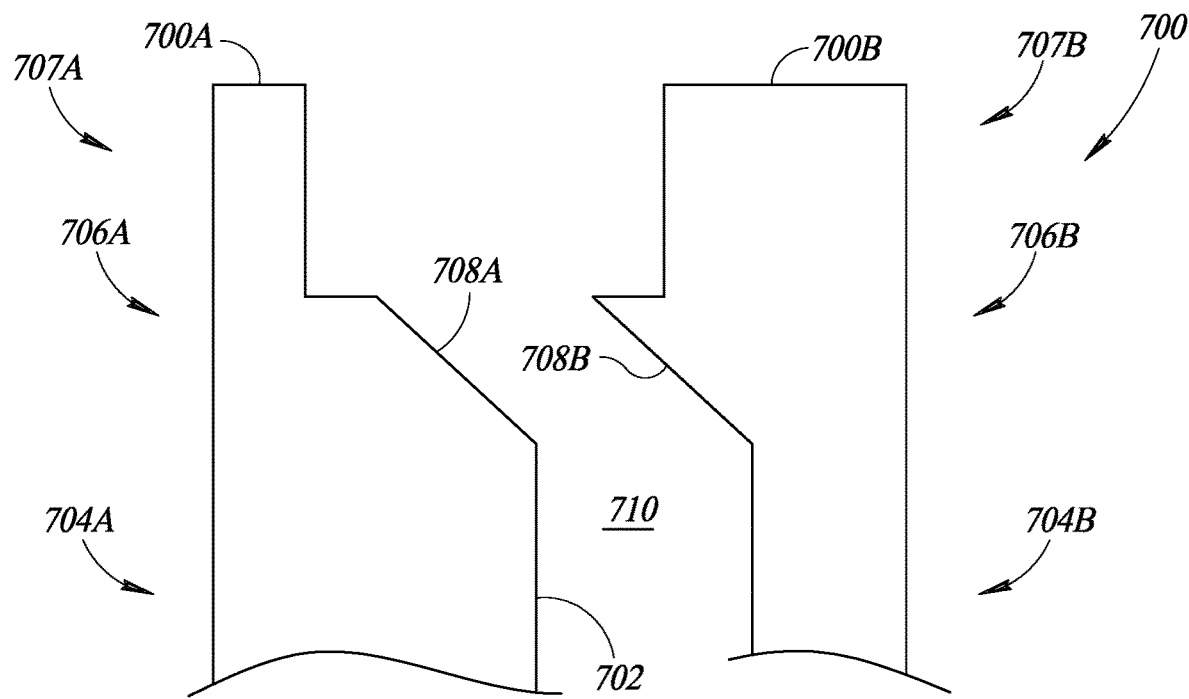
FIG. 7A illustrates a sectional view of mounting area portions of two lenses of a lens assembly, showing complementary angled mounting microfeatures on the lenses, when the lenses are separated, in accordance with the described techniques of the present disclosure.
Figure 7B:
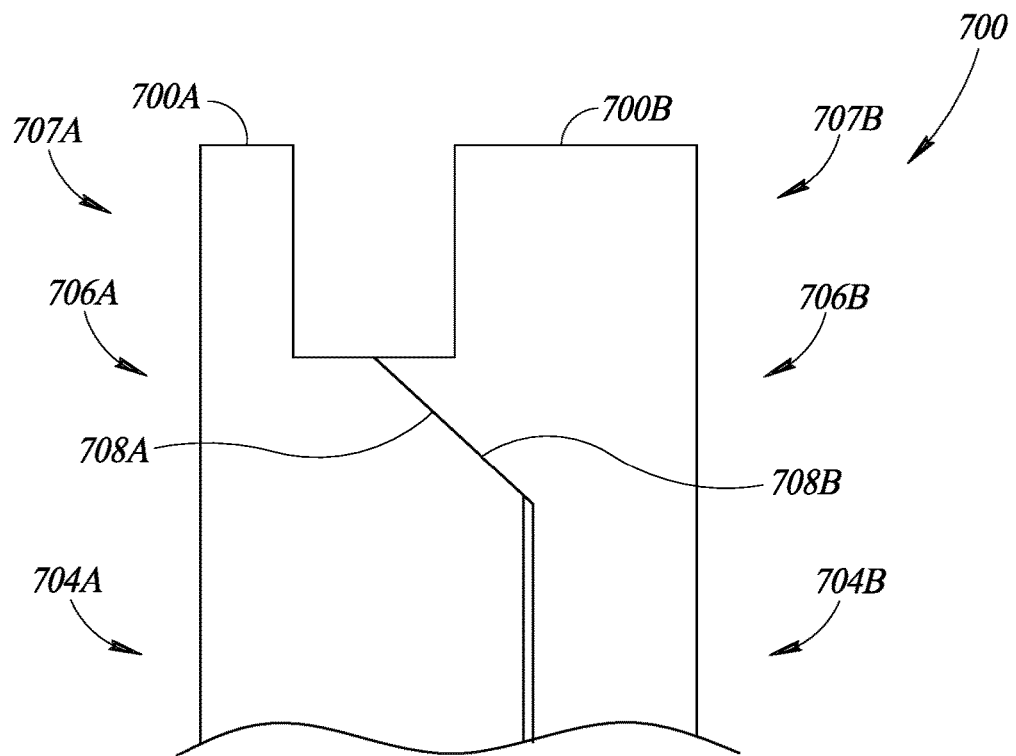
FIG. 7B illustrates a sectional view of the mounting area portions of the two lenses of the lens assembly of FIG. 7A when the lenses are coupled together, in accordance with the described techniques of the present disclosure.

FIGS. 7A-7B illustrate sectional views of mounting areas and flange portions of lenses of a lens assembly 700 when the lenses thereof are separated (FIG. 7A) (e.g., prior to manufacturing) and when the lenses are coupled together (FIG. 7B). In particular, the lens assembly 700 includes a first lens 700A and a second lens 700B. The first lens 700A may be a relatively thin lens that has optical transmission microfeatures 702 (e.g., Fresnel pattern) on at least one surface of an optical transmission area 704A thereof, and mounting microfeatures 708A on at least one surface of a mounting area 706A that at least partially surrounds the optical transmission area 704A. A flange area 707A is positioned radially outward of the mounting area 706A, as discussed above. The mounting microfeatures 708A may extend around all or a portion of the peripheral mounting area 706A of the lens 700A. The second lens 700B may be a relatively thick lens that does not include optical transmission microfeatures on the surfaces in an optical transmission area 704B, and includes mounting microfeatures 708B on at least one surface of a mounting area 706B that at least partially surrounds the optical transmission area 704B. A flange area 707B is positioned radially outward of the mounting area 706B. The mounting microfeatures 708B may extend around all or a portion of the peripheral mounting area 706B of the lens 700B. The surfaces in the optical transmission area 704B of the second lens 700B may be plano-convex, plano-concave, concave-concave, convex-concave, etc.

The mounting microfeatures 708A and 708B may be formed on the lenses 700A and 700B by the same precision process used to form the optical transmission microfeatures 702 on the first lens 700A. As a non-limiting example, negative patterns of the mounting microfeatures 708A and 708B may be cut into respective surfaces of oversized mold inserts using a precision cutting process (e.g., single point diamond turning), and the resulting mold inserts may be used in an injection mold apparatus to produce the lenses 700A and 700B that include the mounting microfeatures 708A and 708B as well as the desired surface shapes for the optical transmission areas.

In the example of FIGS. 7A and 7B, the mounting microfeatures 708A and 708B comprises complementary angled (relative to the direction of optical transmission) surfaces or ridges that may be mated together (e.g., press fit, friction fit) during a manufacturing process for the lens assembly 700. For example, the lenses 700A and 700B may be coupled together whereby the mounting microfeature 708A mates with the mounting microfeature 708B to form a friction or press fit, thereby coupling the lenses 700A and 700B together. It is noted that the respective flange areas 707A and 707B may remain separated from each other when the mounting microfeatures 708A and 708B are coupled together. In at least some implementations, the lenses 700A and 700B may be brought together and sealed within a vacuum in a vacuum chamber, and then the vacuum chamber may be vented to atmospheric pressure, causing the lenses 700A and 700B remain sealed together with a vacuum in a cavity 710 therebetween. Since the mounting microfeatures 708A and 708B are shaped and sized using a high precision process, the lenses 700A and 700B are self-aligned within a very low tolerance (e.g., within 5-10 microns) when the lenses are coupled together. In addition to not requiring passive or active alignment, the mounting microfeatures 708A and 708B allow the lenses 700A and 700B to be coupled together and aligned without requiring use of an adhesive or other fastener.

Figure 8A:
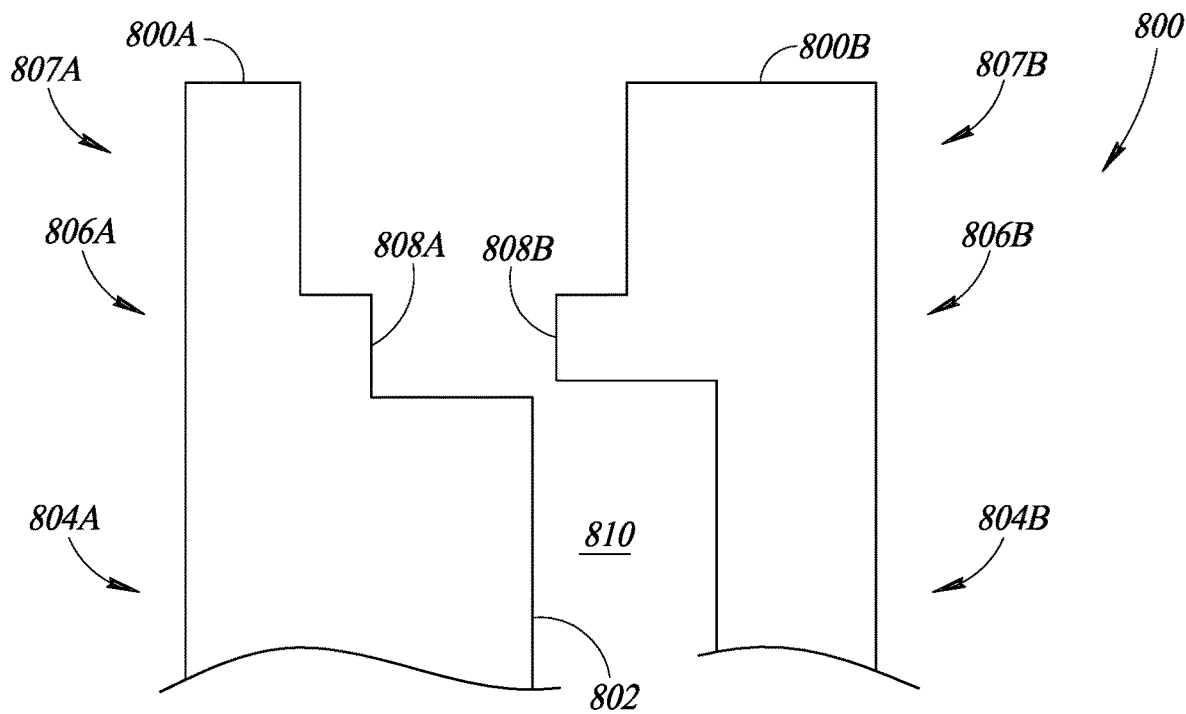
FIG. 8A illustrates a sectional view of mounting area portions of two lenses of a lens assembly, showing complementary straight mounting microfeatures on the lenses, when the lenses are separated, in accordance with the described techniques of the present disclosure.
Figure 8B:
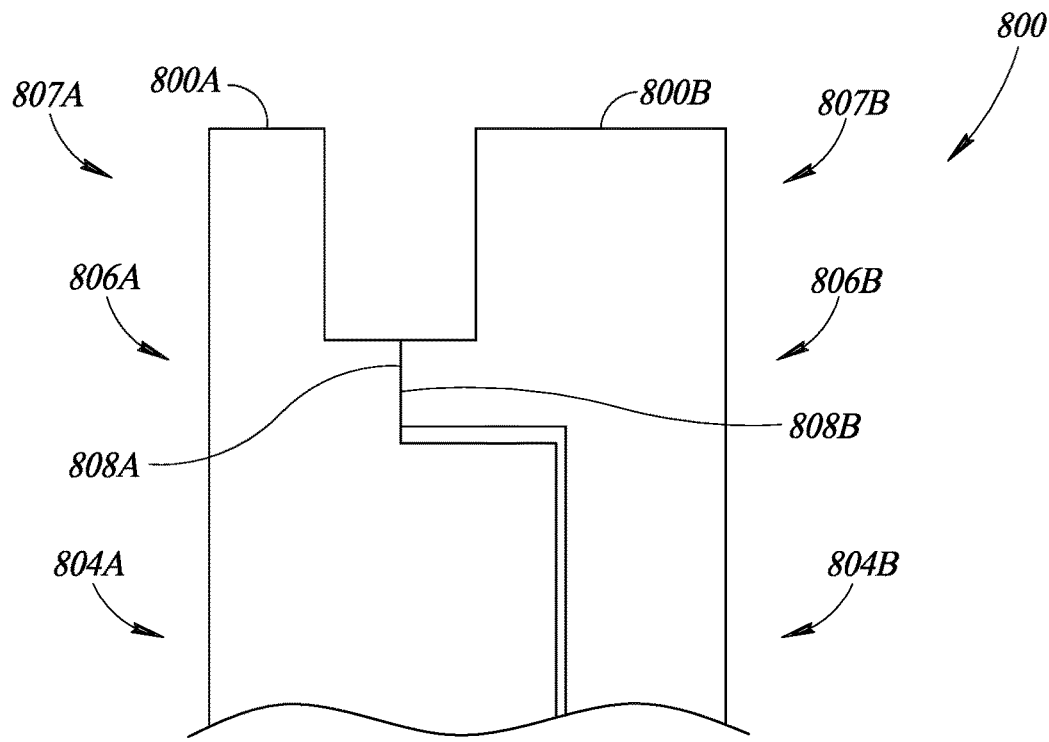
FIG. 8B illustrates a sectional view of the mounting area portions of the two lenses of the lens assembly of FIG. 8A when the lenses are coupled together, in accordance with the described techniques of the present disclosure.

FIGS. 8A-8B illustrate sectional views of mounting areas and flange portions of lenses of a lens assembly 800 when the lenses thereof are separated (FIG. 8A) and when the lenses are coupled together (FIG. 8B). In particular, the lens assembly 800 includes a first lens 800A and a second lens 800B. The first lens 800A may be a relatively thin lens that has optical transmission microfeatures 802 (e.g., Fresnel pattern) on at least one surface of an optical transmission area 804A thereof, and mounting microfeatures 808A on at least one surface of a mounting area 806A that at least partially surrounds the optical transmission area 804A. A flange area 807A is positioned radially outward of the mounting area 806A, as discussed above. The mounting microfeatures 808A may extend around all or a portion of the peripheral mounting area 806A of the lens 800A. The second lens 800B may be a relatively thick lens that does not include optical transmission microfeatures on the surfaces in an optical transmission area 804B, and includes mounting microfeatures 808B on at least one surface of a mounting area 806B that at least partially surrounds the optical transmission area 804B. A flange area 807B is positioned radially outward of the mounting area 806B. The mounting microfeatures 808B may extend around all or a portion of the peripheral mounting area 806B of the lens 800B. The surfaces in the optical transmission area 804B of the second lens 800B may be plano-convex, plano-concave, concave-concave, convex-concave, etc.

The mounting microfeatures 808A and 808B may be formed on the lenses 800A and 800B by the same precision process used to form the optical transmission microfeatures 802 on the first lens 800A. As a non-limiting example, negative patterns of the mounting microfeatures 808A and 808B may be cut into respective surfaces of oversized mold inserts using a precision cutting process (e.g., single point diamond turning), and the resulting mold inserts may be used in an injection mold apparatus to produce the lenses 800A and 800B that include the mounting microfeatures 808A and 808B as well as the desired surface shapes for the optical transmission areas.

In the example of FIGS. 8A-8B, the mounting microfeatures 808A and 808B comprise complementary surfaces or ridges that may be mated together (e.g., press fit, friction fit) during a manufacturing process for the lens assembly 800. For example, the lenses 800A and 800B may be coupled together whereby the mounting microfeature 808A mates with the mounting microfeature 808B to form a friction or press fit, thereby coupling the lenses 800A and 800B together. It is noted that the respective flange areas 807A and 807B may remain separated from each other when the mounting microfeatures 808A and 808B are coupled together. In at least some implementations, the lenses 800A and 800B may be brought together and sealed within a vacuum in a vacuum chamber, and then the vacuum chamber may be vented to atmospheric pressure, causing the lenses 800A and 800B remain sealed together with a vacuum in a cavity 810 therebetween. Since the mounting microfeatures 808A and 808B are shaped and sized using a high precision process, the lenses 800A and 800B are self-aligned within a very low tolerance (e.g., within 5-10 microns) when the lenses are coupled together. In addition to not requiring passive or active alignment, the mounting microfeatures 808A and 808B allow the lenses 800A and 800B to be coupled together and aligned without requiring use of an adhesive or other fastener.

Figure 9A:
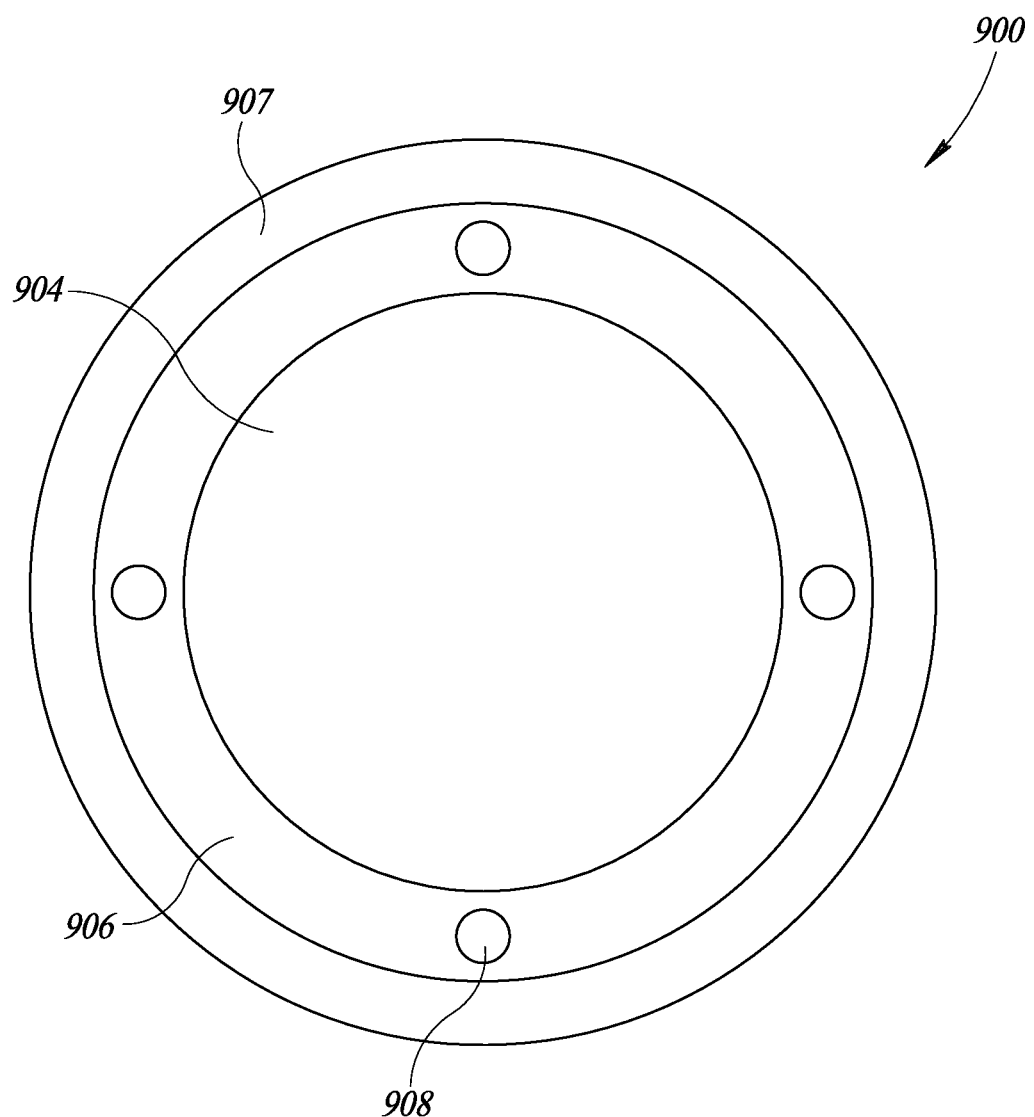
FIG. 9A shows a top view of two lenses of a lens assembly, showing complementary pin and aperture mounting microfeatures on the lenses, in accordance with the described techniques of the present disclosure.
Figure 9B:
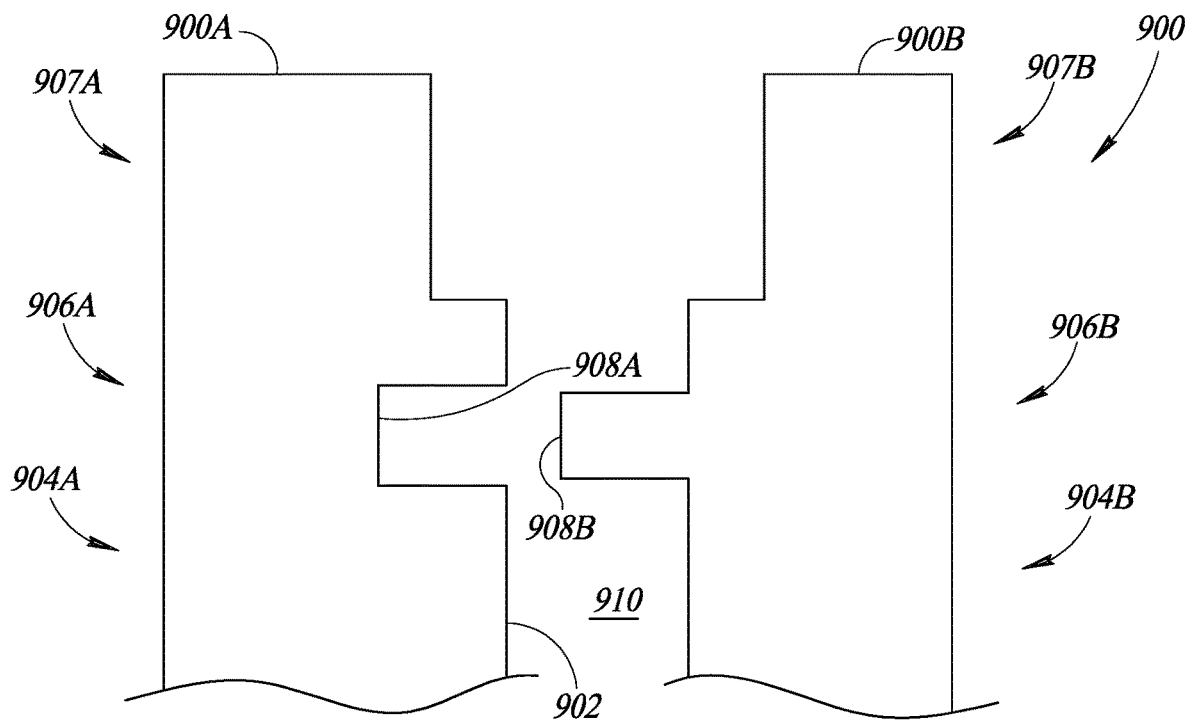
FIG. 9B shows a sectional view of the lens assembly also shown in FIG. 9A, when the lenses of the lens assembly are separated, in accordance with the described techniques of the present disclosure.
Figure 9C:
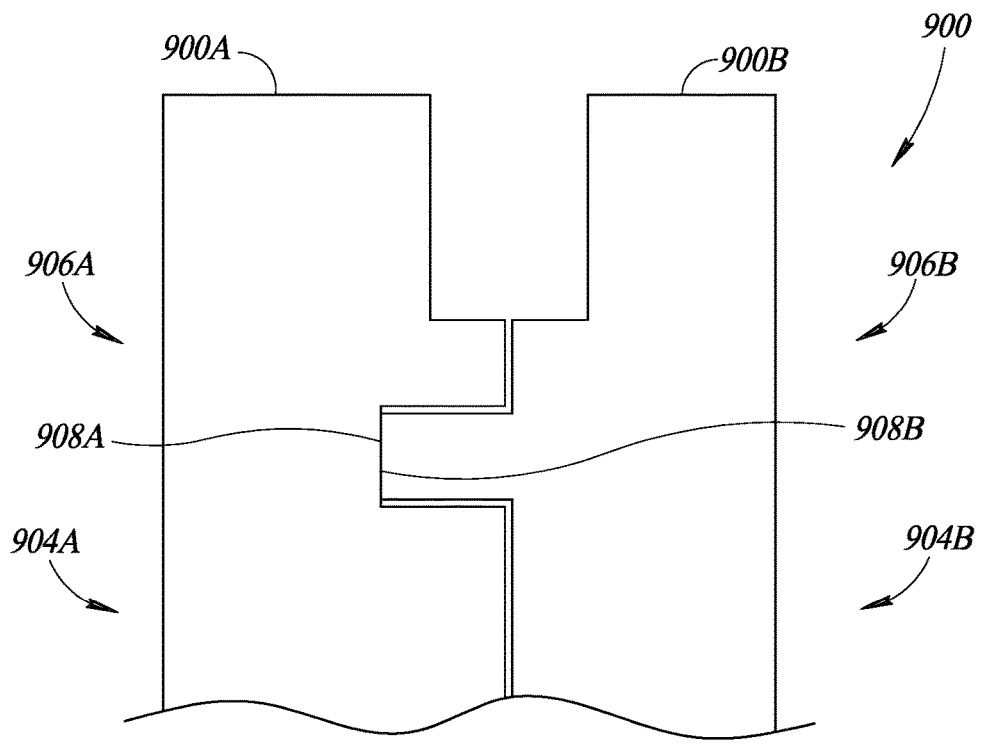
FIG. 9C shows a sectional view of the lens assembly also shown in FIG. 9A, when the lenses of the lens assembly are coupled together, in accordance with the described techniques of the present disclosure.

FIG. 9A illustrates a top view of a lens assembly 900, FIG. 9B illustrates a sectional view of mounting areas and flange portions of the lenses of the lens assembly 900 when the lenses are separated, and FIG. 9C illustrates a sectional view when the lenses are coupled together. The lens assembly 900 includes a central optical transmission area 904, a peripheral mounting area 906, and a flange area 907. The lenses of the of the lens assembly are aligned with each other and mounted together using a plurality of mounting microfeature assemblies 908 disposed in the mounting area 906. Although four mounting microfeature assemblies are shown in FIG. 9A, it should be appreciated that more or fewer mounting microfeature assemblies may be provided in the mounting area.

The lens assembly 900 includes a first lens 900A coupled to a second lens 900B. The first lens 900A may be a relatively thin lens that has optical transmission microfeatures 902 (e.g., Fresnel pattern) on at least one surface of the optical transmission area 904A thereof, and mounting microfeatures 908A on at least one surface of the mounting area 906A that at least partially surrounds the optical transmission area 904A. The flange area 907A is positioned radially outward of the mounting area 906A. The mounting microfeatures 908A may extend around all or a portion of the peripheral mounting area 906A of the lens 900A. The second lens 900B may be a relatively thick lens that does not include optical transmission microfeatures on the surfaces in an optical transmission area 904B, and includes corresponding mounting microfeatures 908B on at least one surface of a mounting area 906B that at least partially surrounds the optical transmission area 904B. The flange area 907B is positioned radially outward of the mounting area 906B. The mounting microfeatures 908B may extend around all or a portion of the peripheral mounting area 906B of the lens 900B. The surfaces in the optical transmission area 904B of the second lens 900B may be plano-convex, plano-concave, concave-concave, convex-concave, etc.

The mounting microfeatures 908A and 908B may be formed on the lenses 900A and 900B by the same precision process used to form the optical transmission microfeatures 902 on the first lens 900A. As a non-limiting example, negative patterns of the mounting microfeatures 908A and 908B may be cut into respective surfaces of oversized mold inserts using a precision cutting process (e.g., single point diamond turning), and the resulting mold inserts may be used in an injection mold apparatus to produce the lenses 900A and 900B that include the mounting microfeatures 908A and 908B as well as the desired surface shapes for the optical transmission areas.

In the example of FIGS. 9B and 9C, the mounting microfeatures 908A and 908B comprise complementary "pins" (e.g., pin 908B) and "apertures" (e.g., aperture 908A) that may be mated together (e.g., press fit, friction fit) during a manufacturing process for the lens assembly 900. For example, the lenses 900A and 900B may be coupled together whereby the mounting microfeature 908B is inserted into the mounting microfeature 908A to form a friction or press fit, thereby coupling the lenses 900A and 900B together. In at least some implementations, the lenses 900A and 900B may be brought together and sealed within a vacuum in a vacuum chamber, and then the vacuum chamber may be vented to atmospheric pressure, causing the lenses 900A and 900B remain sealed together with a vacuum in a cavity 910 therebetween. Since the mounting microfeatures 908A and 908B are shaped and sized using a high precision process, the lenses 900A and 900B are self-aligned within a very low tolerance (e.g., within 5-10 microns) when the lenses are coupled together. In addition to not requiring passive or active alignment, the mounting microfeatures 908A and 908B allow the lenses 900A and 900B to be coupled together and aligned without requiring use of an adhesive or other fastener.

Those of skill in the art will recognize that many of the methods or algorithms set out herein may employ additional acts, may omit some acts, and/or may execute acts in a different order than specified.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The various embodiments described above can be combined to provide further embodiments. All of the commonly assigned US patent application publications, US patent applications, foreign patents, foreign patent applications and non-patent publications referred to in this specification and/or listed in the Application Data Sheet, including but not limited to U.S. Provisional Application No. 62/588,073 filed Nov. 17, 2017 and U.S. Provisional Application No. 62/624,651 filed Jan. 31, 2018, and U.S. application Ser. No. 16/191,206 filed Nov. 14, 2018, are incorporated herein by reference, in their entirety.

The invention claimed is:

1. A method of manufacturing a lens, the method comprising:
    providing a first mold insert comprising a machinable surface, the machinable surface comprising a central region and a peripheral region, the central region corresponding to an optical transmission area of a surface of a first lens to be manufactured using the first mold insert, and the peripheral region corresponding to a mounting area of a surface of the first lens;
    machining a negative pattern of optical transmission microfeatures onto the central region of the machinable surface of the first mold insert;
    machining a negative pattern of mounting microfeatures onto the peripheral region of the machinable surface of the first mold insert; and
    molding the first lens using the machined first mold insert.

2. The method of claim 1, further comprising:
    providing a second mold insert comprising a machinable surface, the machinable surface comprising a central region and a peripheral region, the central region corresponding to an optical transmission area of a surface of a second lens to be manufactured using the second mold insert, and the peripheral region corresponding to a mounting area of a surface of the second lens;
    machining a negative pattern of a curved surface onto the central region of the machinable surface of the second mold insert;
    machining a negative pattern of mounting microfeatures onto the peripheral region of the machinable surface of the second mold insert; and
    molding the second lens using the machined second mold insert.

3. The method of claim 2 wherein machining a negative pattern of mounting microfeatures onto the peripheral region of the machinable surface of the second mold insert comprises machining at least one negative pattern for a mounting ridge onto the peripheral region of the machinable surface of the second mold insert.

4. The method of claim 2 wherein machining a negative pattern of mounting microfeatures onto the peripheral region of the machinable surface of the first mold insert comprises machining at least one negative pattern for a mounting ridge onto the peripheral region of the machinable surface of the first mold insert, and machining a negative pattern of mounting microfeatures onto the peripheral region of the machinable surface of the second mold insert comprises machining at least one negative pattern for a mounting ridge onto the peripheral region of the machinable surface of the second mold insert.

5. The method of claim 2, further comprising:
    mating the mounting microfeatures of the first and second lenses together to couple the first and second lens together in alignment.

6. The method of claim 5 wherein mating the mounting microfeatures of the first and second lenses together comprises mating the mounting microfeatures of the first and second lenses together in a vacuum chamber.

7. The method of claim 1 wherein machining a negative pattern of optical transmission microfeatures onto the central region of the machinable surface of the first mold insert comprises machining a negative pattern for a Fresnel pattern onto the central region of the machinable surface of the first mold insert.

8. The method of claim 1 wherein machining a negative pattern of mounting microfeatures onto the peripheral region of the machinable surface of the first mold insert comprises machining at least one negative pattern for a mounting ridge onto the peripheral region of the machinable surface of the first mold insert.

9. A method of manufacturing a lens, the method comprising:
    providing a first mold insert comprising a machinable surface, the machinable surface comprising a central region and a peripheral region, the central region corresponding to an optical transmission area of a surface of a first lens to be manufactured using the first mold insert, and the peripheral region corresponding to a mounting area of a surface of the first lens;
    machining a negative pattern of optical transmission microfeatures onto the central region of the machinable surface of the first mold insert;
    machining a negative pattern of mounting microfeatures onto the peripheral region of the machinable surface of the first mold insert;
    providing a second mold insert comprising a machinable surface, the machinable surface comprising a central region and a peripheral region, the central region corresponding to an optical transmission area of a surface of a second lens to be manufactured using the second mold insert, and the peripheral region corresponding to a mounting area of a surface of the second lens;
    machining a negative pattern of a curved surface onto the central region of the machinable surface of the second mold insert;
    machining a negative pattern of mounting microfeatures onto the peripheral region of the machinable surface of the second mold insert;
    molding the first lens using the machined first mold insert; and
    molding the second lens using the machined second mold insert;
    wherein machining a negative pattern of optical transmission microfeatures onto the central region of the machinable surface of the first mold insert comprises machining a negative pattern for a Fresnel pattern onto the central region of the machinable surface of the first mold insert.

10. The method of claim 9, further comprising:
    mating the mounting microfeatures of the first and second lenses together to couple the first and second lens together in alignment.

11. The method of claim 10 wherein mating the mounting microfeatures of the first and second lenses together comprises mating the mounting microfeatures of the first and second lenses together in a vacuum chamber.

12. The method of claim 9 wherein machining a negative pattern of mounting microfeatures onto the peripheral region of the machinable surface of the first mold insert comprises machining at least one negative pattern for a mounting ridge onto the peripheral region of the machinable surface of the first mold insert.

13. The method of claim 9 wherein machining a negative pattern of mounting microfeatures onto the peripheral region of the machinable surface of the second mold insert comprises machining at least one negative pattern for a mounting ridge onto the peripheral region of the machinable surface of the second mold insert.

14. A method of manufacturing a lens, the method comprising:
  providing a first mold insert comprising a machinable surface, the machinable surface comprising a central region and a peripheral region, the central region corresponding to an optical transmission area of a surface of a first lens to be manufactured using the first mold insert, and the peripheral region corresponding to a mounting area of a surface of the first lens;
  machining a negative pattern of optical transmission microfeatures onto the central region of the machinable surface of the first mold insert, including machining a negative pattern for a Fresnel pattern onto the central region of the machinable surface of the first mold insert;
  machining a negative pattern of mounting microfeatures onto the peripheral region of the machinable surface of the first mold insert;
  providing a second mold insert comprising a machinable surface, the machinable surface comprising a central region and a peripheral region, the central region corresponding to an optical transmission area of a surface of a second lens to be manufactured using the second mold insert, and the peripheral region corresponding to a mounting area of a surface of the second lens;
  machining a negative pattern of a curved surface onto the central region of the machinable surface of the second mold insert;
  machining a negative pattern of mounting microfeatures onto the peripheral region of the machinable surface of the second mold insert;
  molding the first lens using the machined first mold insert in an injection mold process;
  molding the second lens using the machined second mold insert in an injection mold process; and
  mating the mounting microfeatures of the first and second lenses together in a vacuum chamber to couple the first and second lens together in alignment.

15. The method of claim 14 wherein machining a negative pattern of mounting microfeatures onto the peripheral region of the machinable surface of the first mold insert comprises machining at least one negative pattern for a mounting ridge onto the peripheral region of the machinable surface of the first mold insert.

16. The method of claim 14 wherein machining a negative pattern of mounting microfeatures onto the peripheral region of the machinable surface of the second mold insert comprises machining at least one negative pattern for a mounting ridge onto the peripheral region of the machinable surface of the second mold insert.

17. The method of claim 14 wherein machining a negative pattern of mounting microfeatures onto the peripheral region of the machinable surface of the first mold insert comprises machining at least one negative pattern for a mounting ridge onto the peripheral region of the machinable surface of the first mold insert, and machining a negative pattern of mounting microfeatures onto the peripheral region of the machinable surface of the second mold insert comprises machining at least one negative pattern for a mounting ridge onto the peripheral region of the machinable surface of the second mold insert.

* * * * *